S. MUNSON.
BEET HARVESTER.
APPLICATION FILED JULY 2, 1910.
1,145,785.
Patented July 6, 1915.
3 SHEETS—SHEET 1.
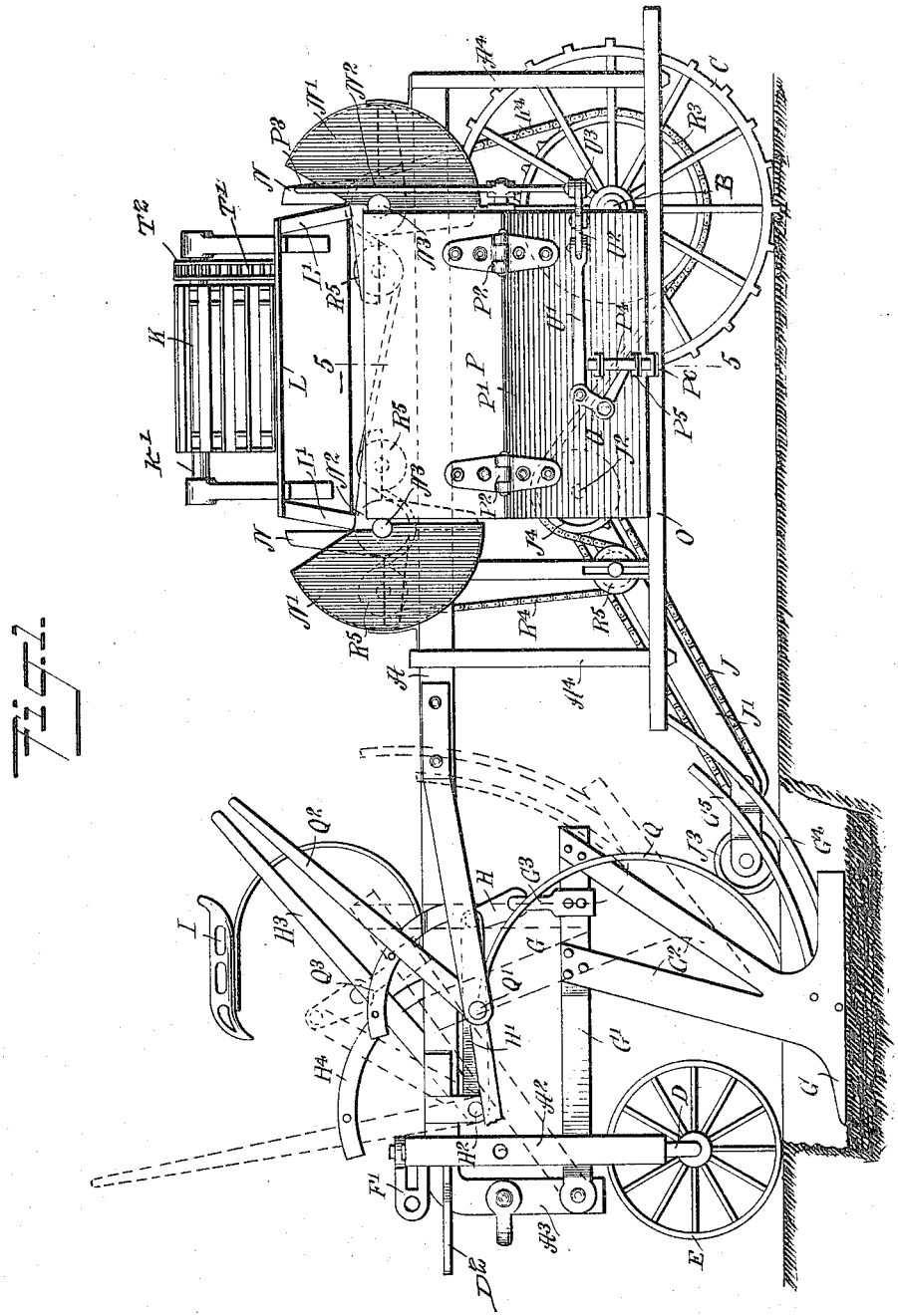
WITNESSES:
INVENTOR
Sweney Munson
BY Munn & Co
ATTORNEYS

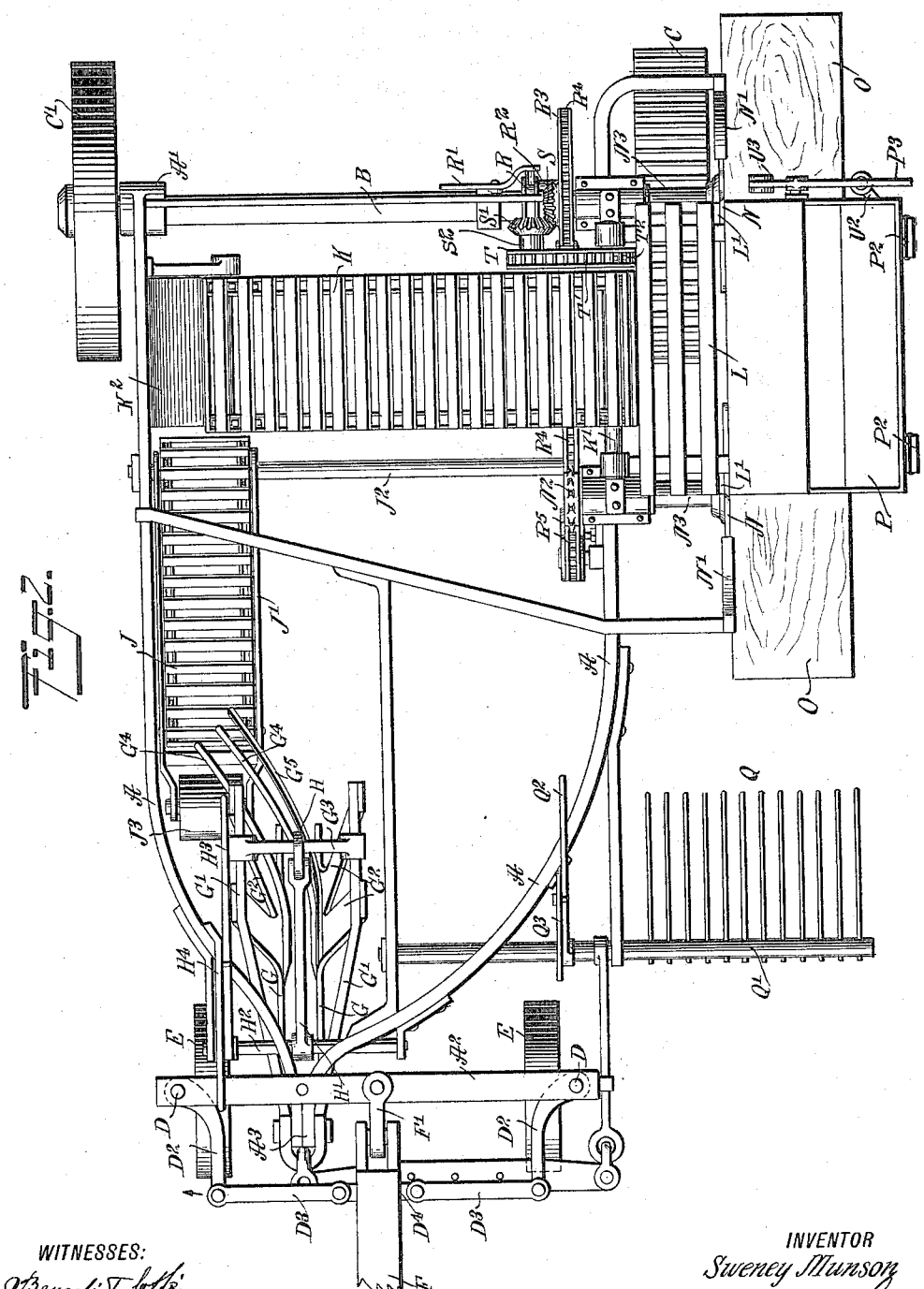

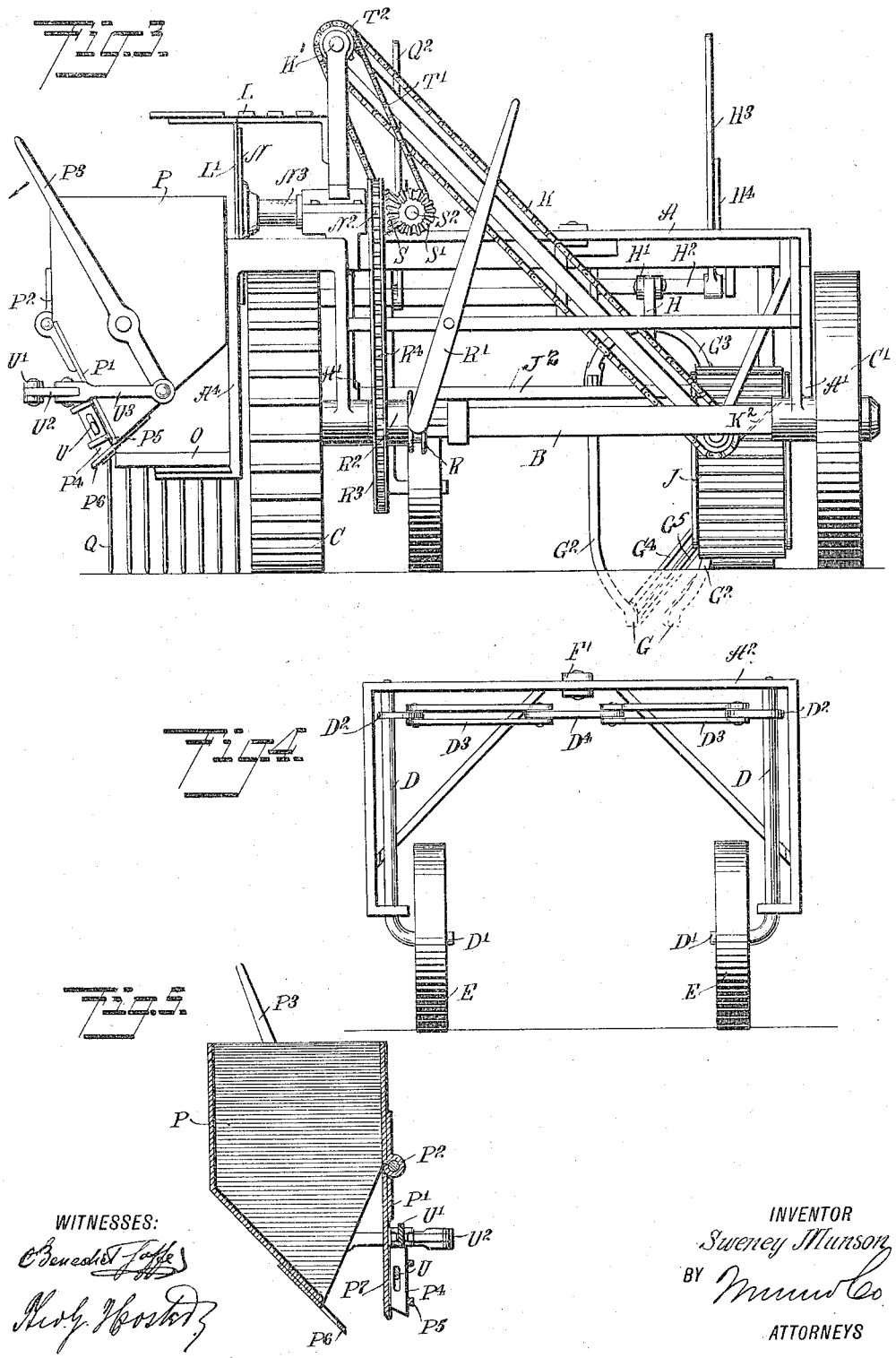

UNITED STATES PATENT OFFICE.

SWENEY MUNSON, OF FOWLER, COLORADO.

BEET-HARVESTER.

1,145,785.

Specification of Letters Patent.  Patented July 6, 1915.

Application filed July 2, 1910. Serial No. 570,161.

*To all whom it may concern:*

Be it known that I, SWENEY MUNSON, a citizen of the United States, and a resident of Fowler, in the county of Otero and State of Colorado, have invented a new and Improved Beet-Harvester, of which the following is a full, clear, and exact description.

The object of the invention is to provide a new and improved beet harvester, arranged to plow up the beets and to elevate the same to a table with a view to bring the beets within convenient reach of the operator taking hold of the beets, for holding the same in position for topping knives to cut off the tops of the beets and separate the same, the beets then being placed by the operator in a hopper, from which the beets can be periodically discharged onto a space of the field previously cleaned by a rake forming part of the machine, thus facilitating the subsequent handling of the beets.

For the purpose mentioned, use is made of a plow for plowing up the beets and delivering the same to an elevator, which discharges onto a second elevator carrying the beets to a table, adjacent to which are located topping knives for cutting off the beet tops and a hopper for receiving the beets.

A practical embodiment of the invention is represented in the accompanying drawings forming a part of this specification, in which similar characters of reference indicate corresponding parts in all the views.

Figure 1 is a side elevation of the beet harvester showing the plow in position for plowing up the beets; Fig. 2 is a plan view of the same; Fig. 3 is a rear end elevation of the same; Fig. 4 is a front end elevation of the truck; and Fig. 5 is a cross section of the hopper on the line 5—5 of Fig. 1, and showing the hopper gate open.

The beet harvester is mounted on a suitably constructed truck having a main frame A provided at its rear end with hangers $A'$, in which is journaled a rear axle B carrying the wheels C, $C'$ traveling on the ground and of which the wheel C is preferably a wide traction wheel for turning the axle B. On the forward end of the truck frame A is secured a transversely-extending U-shaped frame $A^2$, in which are journaled the vertically-disposed shafts D, terminating at their lower ends in stubs axles $D'$, carrying the front or steering wheels E traveling on the ground. Each of the shafts D is provided with an arm $D^2$, connected by a link $D^3$ with a link $D^4$, extending under a pole F, pivoted on the clevis $F'$, fulcrumed on the front frame $A^2$. The sides of the pole F are adapted to engage the inner ends of the links $D^3$, so that when the pole F is swung to one side it acts on the corresponding link $D^3$, to turn the shafts D, so as to steer the wheels E in the same direction in which the tongue F is swung by the action of the team employed for pulling the machine over the field, and hitched to the tongue F in the usual manner.

The front end of the main truck frame A is provided with a hanger $A^3$, on which are pivoted the plow beams $G'$, supporting at their rear ends the downwardly-extending side arms $G^2$, supporting at their lower ends the plow points G, spaced apart to pick up the beets between them, and cause the beets to travel rearwardly onto and over guide arms $G^4$, $G^5$, extending rearwardly, upwardly and outwardly from the plow points G (see Figs. 1 and 2). The plow beams $G'$ are connected with each other near their rear ends by a yoke $G^3$, engaged by a link H connected with an arm $H'$, attached to a transversely-extending shaft $H^2$, journaled in the forward portion of the main truck frame A, and on the said shaft $H^2$ is secured a lever $H^3$, under the control of the driver seated on the seat I supported from the main truck frame A. When the machine is drawn over the field for plowing up the beets, the lever $H^3$ is in a lowermost position, so as to lower the plow for plowing up the beets, and when the beet harvester is taken to or from the field of action, then the plow is raised by the operator swinging the lever $H^3$ upwardly and forwardly and locking it in place on a segment $H^4$, to support the plow points G above the ground.

The guide arms $G^4$ are located opposite each other, while the guide arm $G^5$ is a distance above, so as to prevent the beets from falling off while being pushed rearwardly one by the other, the beets being finally discharged from the rear ends of the guide arms $G^4$, $G^5$ onto the lower end of an elevator J, having its frame $J'$ mounted to swing loosely on a transversely-extending shaft $J^2$ journaled on the truck frame A. The elevator J extends rearwardly and upwardly, and the forward end of the frame $J'$ is extended and provided with a wheel $J^3$ adapted to travel on the ground, to support the free end of the elevator frame J and to hold it in proper relation to the guide arms $G^4$, $G^5$. The upper end of the elevator J discharges onto the lower end of a second elevator K, arranged transversely and discharging at its upper end onto a slatted table L, supported by bars $L'$ from the main truck frame A, the said bars $L'$ also acting in conjunction with the blades of revoluble topping knives N, for cutting off the tops of the beets held by the operators standing on a platform or running board O, supported by hangers $A^4$ from the main truck frame A. A hopper P is mounted on the main truck frame A, in such a manner that its top is a distance below the table L (see Fig. 3). and is between the operators standing at the ends of the running board O, so that the operators, after the tops are cut off from the beets by the knives N, can readily place the beets into the hopper P, it being understood that the beets plowed up and delivered to the table L can be readily handled by two operators, for topping off the beets and for placing the same into the hopper P.

The beets are periodically discharged from the hopper P, which latter is for this purpose provided with a gate $P'$ hung on hinges $P^2$, and adapted to be swung open by one of the operators actuating a hand lever $P^3$, but previous to discharging the beets from the hopper P, use is made of a rake Q, mounted to turn on the truck frame A and under the control of the driver seated on the seat I. Now by the use of the rake Q, the ground in front of the hopper P can be cleaned, so that when the gate $P'$ is subsequently opened, the beets fall onto a clean piece of ground, thus facilitating the subsequent handling of the beets as the latter are free of tops, leaves, vines and other rubbish that may be on the field.

The elevators J and K are preferably of the endless belt slat type, so that the beets in their upward travel are freed of any adhering ground, and consequently reach the table L and the operators in a comparatively clean condition.

In order to prevent injury to the operators attending to the topping off of the beets, guards $N'$ are provided, extending over that portion of the revoluble topping knives N adjacent to the operators, as plainly indicated in Figs. 1 and 2.

The shaft $Q'$ of the rake Q extends transversely and is journaled in suitable bearings on the truck frame A, and on the said shaft $Q'$ is secured a hand lever $Q^2$, within reach of the driver seated on the seat I, so that the rake Q can be thrown in or out of action as required. When the rake is not in action, it is held locked in a raised position on a segment $Q^3$ attached to the truck frame A.

Motion in unison is given to the elevators J and K and the topping knives N from the axle B, and for this purpose the following arrangement is made: A clutch member R is mounted to turn with and to slide on the axle B, and the said clutch member is controlled by a shifting lever $R'$, fulcrumed on the main truck frame A (see Fig. 3). The clutch member R is adapted to engage a clutch member $R^2$, secured to or formed on the hub of a sprocket wheel $R^3$, under which passes a sprocket chain $R^4$ also passing under and over sprocket wheels $N^2$, secured on the shafts $N^3$ of the topping knives N, the sprocket chain $R^4$ also passing over a sprocket wheel $J^4$ secured on the shaft $J^2$ previously mentioned and forming part of the elevator J. The sprocket chain $R^4$ also passes over and under suitable guide pulleys $R^5$, arranged adjacent to the wheels $N^2$ and $J^4$, as plainly indicated in Fig. 1, so as to hold the sprocket chain $R^4$ in proper contact with the sprocket wheels $N^2$ and $J^4$. The shaft $N^3$ of the rearmost topping knife N is provided with a bevel gear wheel S in mesh with a bevel gear wheel $S'$, secured on a longitudinally-extending shaft $S^2$, journaled on the truck frame A, and carrying a sprocket wheel T, over which passes a sprocket chain $T'$ also passing over a sprocket wheel $T^2$ secured on the upper shaft $K'$ of the elevator K, so that when the machine is drawn over the field and the clutch member R is in engagement with the clutch member $R^2$, then a simultaneous traveling motion is given to the elevators J and K and a rotary motion to the topping knives N, to permit of cutting off the tops of the beets as previously explained.

The gate $P'$ of the hopper P is located on the outer side of the hopper P and swings transversely so that when the gate $P'$ is opened the beets are discharged onto the ground cleaned by the rake Q, and in the form of windrows, to permit of conveniently loading the beets into carts or other vehicles.

In order to open or close the gate $P'$, use is made of a latch $P^4$, mounted to slide up and down in bearings $P^5$ arranged on the gate $P'$. The latch $P^4$ is adapted to engage a keeper $P^6$ fixed on the bottom of the hopper P, and the latch $P^4$ is engaged by a bell crank lever U fulcrumed on the gate $P'$ and connected by a link $U'$ with a lever $U^2$, likewise fulcrumed on the gate $P'$ and connected by a link $U^3$ with the hand lever $P^3$, fulcrumed on the rear end of the hopper P, as plainly shown in the drawings.

The operator standing on the rear end of the running board O can conveniently manipulate the lever $P^3$ to unlock the gate $P'$, by withdrawing the latch from the keeper $P^6$, so that the gate $P'$ swings into an open vertical position by the pressure of the beets in the hopper P, and the beets then drop down onto the ground in the form of a windrow as the machine is drawn forward.

By having the elevator J running lengthwise of the machine and the elevator K running transversely to the line of movement of the machine, the beets are gradually delivered to a table arranged a considerable distance sidewise from the beets plowed up at the time, so that the cut off tops as well as the beets drop to the ground a distance away from the plowed up ground. It will also be noticed that by arranging the two elevators J and K as described, the machine is rendered very compact, and the beets are delivered to the table L sufficiently high up from the running board O for the operators to conveniently reach and handle the beets.

An inclined delivery plate K² attached to the main frame A, is arranged between the upper end of the elevator J and the lower end of the elevator K, to insure proper passing of the beets from the elevator J to the elevator K.

Having thus described my invention, I claim as new and desire to secure by Letters Patent:

1. In a beet harvester, a wheel supported frame, a longitudinally extending elevator at one side of the frame, a transversely extending elevator at the rear of the frame, a table at the rear of the frame upon which the transverse elevator delivers, revoluble cutters at the ends of the table, means for operating the longitudinal elevator and cutters from the axle of the wheels, and means for operating the transverse elevator from the shaft of one of the cutters.

2. In a beet harvester, a frame, an axle mounted in the frame, said axle carrying supporting wheels at its ends and provided with a sprocket wheel, a longitudinally extending elevator having a sprocket wheel on the shaft of its upper roller, a transversely extending elevator, revoluble cutters at the rear side of the frame and having sprocket wheels on their shafts, a sprocket chain passing around the sprocket wheels of the longitudinally extending elevator, the cutters and axles, and means for operating the transverse elevator from the shaft of one of the cutters.

3. In a beet harvester, a wheel supported frame, a longitudinally extending elevator, revoluble cutters at the rear side of the frame, the shaft of one of the cutters being provided with a gear wheel, means for operating the longitudinal elevator and cutters from the axle of the wheels, a transverse elevator having a sprocket wheel on its upper shaft, a longitudinal shaft provided with a gear wheel meshing with the gear wheel of the said cutter shaft, and a sprocket chain passing over the sprocket wheels of the transverse elevator and the longitudinal shaft.

4. In a beet harvester, a wheel supported frame, a table at the rear end of the frame, a platform below the table and extending in direction of the length thereof, means for delivering beets upon said table, revoluble cutting devices at the ends of the table, each cutting device consisting of a fixed member and a plurality of revoluble blades, and means for operating the cutters from the axle of the wheel.

5. In a beet harvester, a wheel supported frame, a longitudinally extending table at one side of the rear portion of the frame, a longitudinally extending platform below the table and of a greater length than the said table, an endless conveyer for delivering beets upon the table, cutting devices, one at each end of the table, each cutting device consisting of a fixed upright member and a plurality of revoluble blades, and means for operating the cutters and conveyer from the axle of the supporting wheels.

6. In a beet harvester, a wheel supported frame, a table at the rear end of the frame and supported at its ends by upright bars secured to the said frame, a revoluble cutter at one end of the table and consisting of a plurality of blades mounted on a horizontal axis and coacting with the table supporting bar at that end of the table for severing the tops of the beets, and means for operating the cutter from the axle of the supporting wheels.

In testimony whereof I have signed my name to this specification in the presence of two subscribing witnesses.

SWENEY MUNSON.

Witnesses:
  LESLIE L. MUNSON,
  ARTHUR L. MUNSON.